Figure 1:
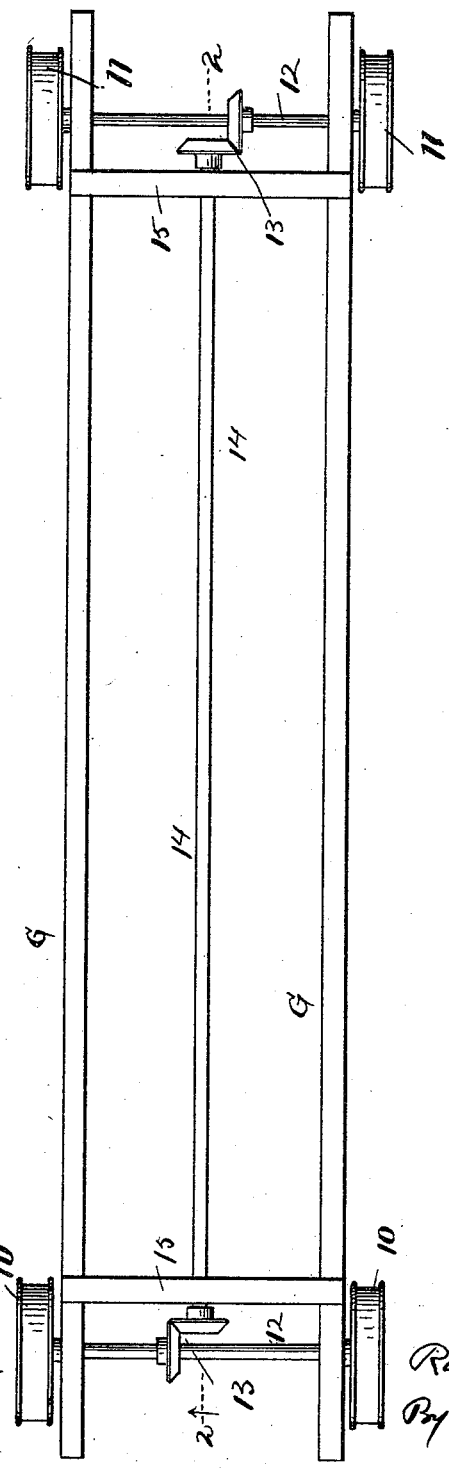

(No Model.) 4 Sheets—Sheet 1.

R. THEW.
EXCAVATOR DIPPER, SCOOP, OR SHOVEL.

No. 530,209. Patented Dec. 4, 1894.

Witnesses,
E Byron Gilchrist

Inventor,
Richard Thew
By Leggett & Leggett
his attys (No Model.) 4 Sheets—Sheet 2.

R. THEW.
EXCAVATOR DIPPER, SCOOP, OR SHOVEL.

No. 530,209. Patented Dec. 4, 1894.

Fig. 2.

Witnesses:
E. Byron Gilchrist

Inventor:
Richard Thew
By Leggett & Leggett
his attorneys.

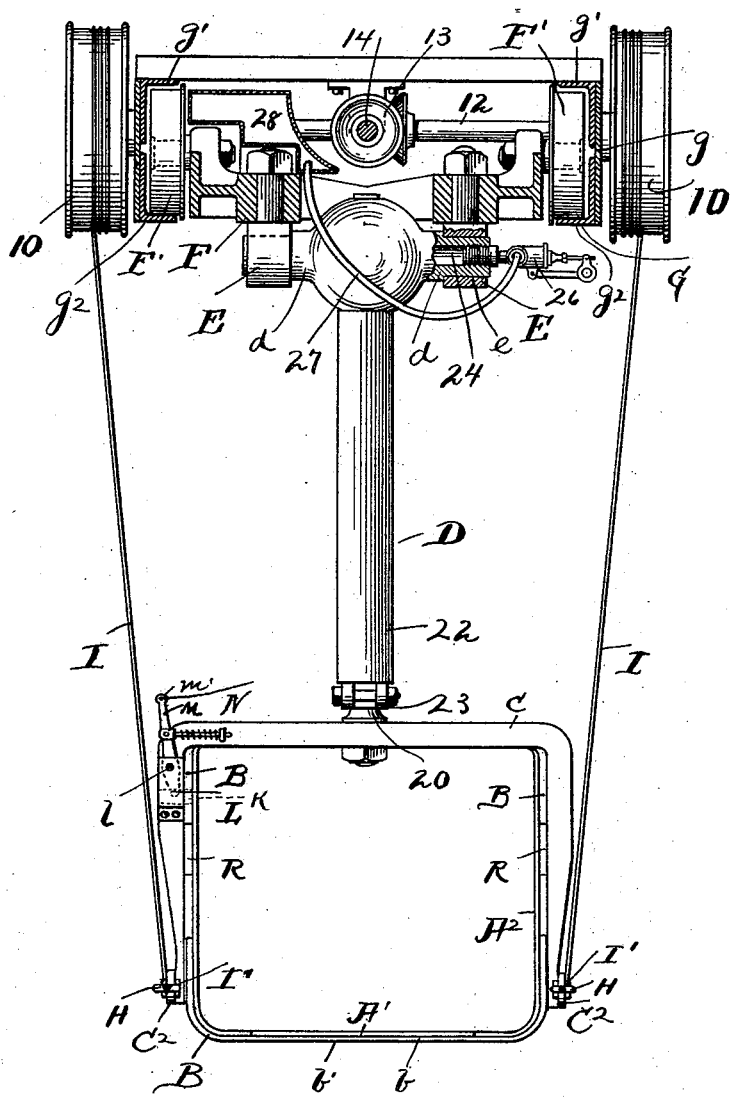

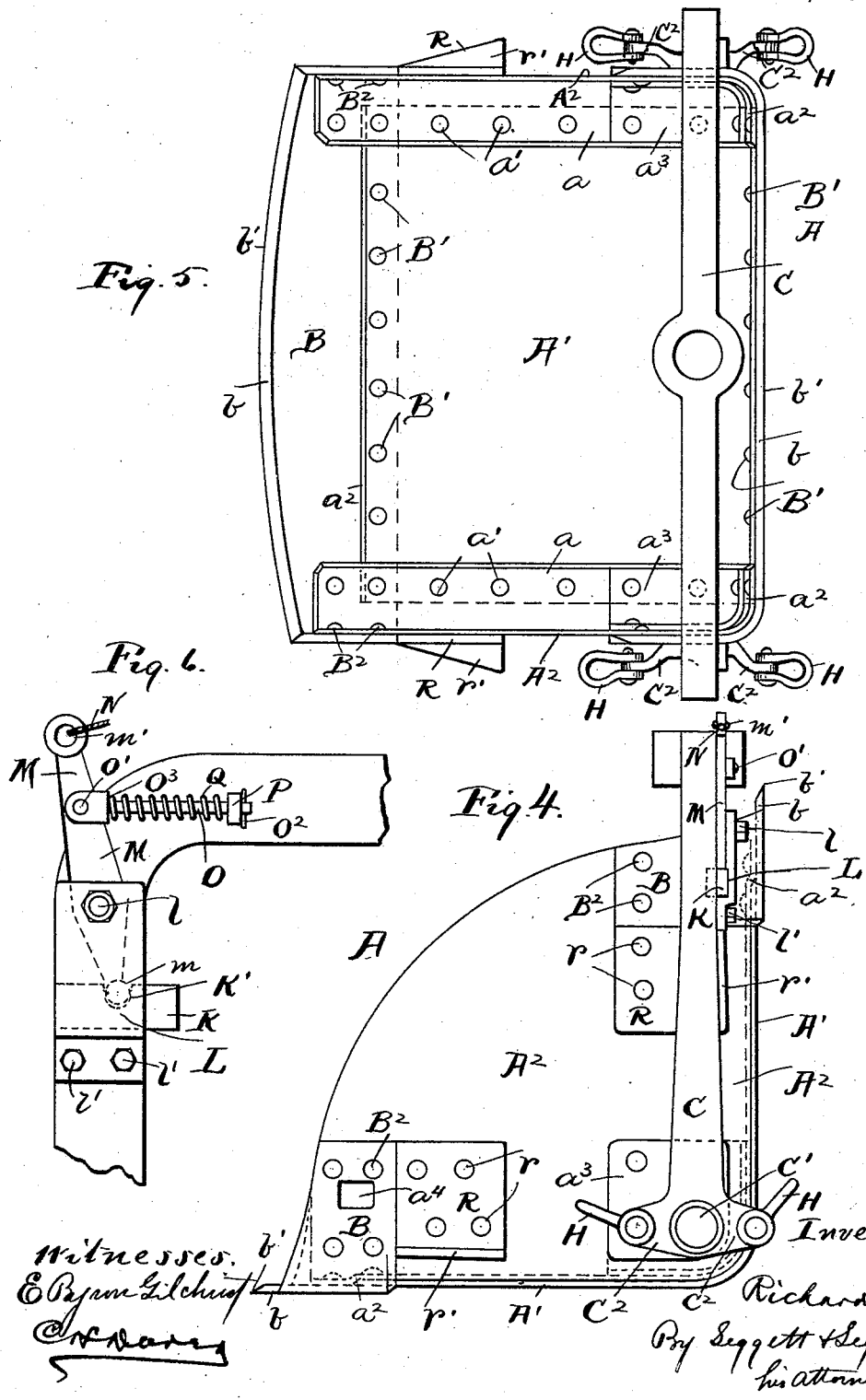

UNITED STATES PATENT OFFICE.

RICHARD THEW, OF CLEVELAND, OHIO.

EXCAVATOR DIPPER, SCOOP, OR SHOVEL.

SPECIFICATION forming part of Letters Patent No. 530,209, dated December 4, 1894.

Application filed August 20, 1892. Serial No. 443,604. (No model.)

*To all whom it may concern:*

Be it known that I, RICHARD THEW, of Cleveland, in the county of Cuyahoga and State of Ohio, have invented certain new and useful Improvements in Scoops or Shovels; and I do hereby declare the following to be a full, clear, and exact description of the invention, such as will enable others skilled in the art to which it pertains to make and use the same.

My invention relates to improvements in scoops or shovels designed more especially for machines employed in handling, for instance, coal, ore, or other material, in vessels, on docks or other places, and for dredging and excavating purposes; and, among other things, my invention consists in providing a double-ended scoop or shovel, a scoop, that after dumping a load, need not be backed up or turned for the next dip, that is, for taking up the next succeeding load but is adapted to dip or take up a load in opposite directions without turning of the scoop or shovel and thereby doubling the amount of work that may be done with the scoop or shovel.

My invention consists, moreover, in certain features of construction and in combination of parts hereinafter described and pointed out in the claims.

In the accompanying drawings, Figure 1 is a plan of a track along which a trolley or carriage to which my improved scoop or shovel is pivotally connected, is adapted to travel, the trolley or carriage, however, not being shown in this figure. Fig. 2 is a longitudinal vertical section on line 2—2 Fig. 1, showing also the trolley or carriage and my improved scoop or shovel connected with said trolley or carriage, a portion of the scoop or shovel-arm or handle and trolley being shown in section to more clearly show the construction of the sections of the handle, that in this figure, are shown drawn apart. Fig. 3 is a transverse section of the track and trolley, showing a front elevation of my scoop or shovel with the sections of the arm or handle telescoped the one within the other. Fig. 4 is a side elevation of the scoop or shovel proper and the bail to and between the ends whereof the body of the scoop or shovel is trunnioned or pivoted. Fig. 5 is a top plan relative to Fig. 4. The scoop or shovel proper in each of Figs. 2, 4, and 5 is shown in one of its extreme positions. Fig. 6 is an elevation in detail exhibiting preferable mechanism for locking the scoop or shovel proper in its extreme positions.

The scoop or shovel, as already indicated, is double-ended, that is, is adapted to dip or take up a load in opposite directions without backing up or turning the scoop or shovel, and is preferably of the form shown in Figs. 2 and 4.

The construction of the scoop or shovel proper is shown very clearly in Figs. 4 and 5. A represents the body of the scoop or shovel, the same being made preferably of steel and composed, in the main, of three sections, a central section A' extending from end to end of the scoop or shovel, or approximately so, and two side sections, $A^2$, flanged inward, as at $a$, and riveted, as at $a'$, to central section A', flanges $a$ being preferably bent outward, as at $a^2$, and extending beyond the ends of central section A', flush with the outer surface of said central section.

The scoop or shovel at each end, terminates in a lip, $b$, extending transversely of the scoop or shovel. Lips $b$ are preferably of steel and pointed, as at $b'$ to cut into the material to be scooped or taken up, and are integral, respectively, with a plate B, that embraces the ends of the scoop or shovel and is riveted to the central and side sections A' $A^2$ of the body of the scoop or shovel, as at B' $B^2$, respectively.

The scoop or shovel is trunnioned or pivoted, as at C', to and between the ends of bail C to which is rigidly attached the one or lower end of an armor handle D. I would here remark that, in order to enlarge the bearing for the trunnions, the sides of the scoop or shovel are preferably reinforced by plate, $a^3$, both on the inner and outer sides. The upper or opposite end of handle D has lateral trunnions, $d$, that have bearing in eyes $e$ of eye-bolts E secured to a trolley or carriage F adapted to travel on a suitable elevated track G and locked at any point along the track by mechanism not shown. Said track is preferably composed of beams $g$, having inwardly-projecting flanges, $g'$ $g^2$, top and bottom, respectively, and wheels F' of the trolley or carriage rest on the lower flanges. It is not considered necessary to show or describe the mechanism for moving the trolley or carriage along the track. Said trolley actuating mechanism might consist of the not uncommon winding-drums and cables engaging the trolley and drums in the usual manner. Apparatus for thus moving a trolley upon a track are so well understood in the art that illustration or description of the same is not considered necessary.

Bail C is preferably made of wrought iron and at each end and at opposite sides of pivotal pins or bolts C', is provided with ears, C², to which are attached clevises, H, for attaching cables, I I', that lead thence over and are attached at their opposite ends to sheaves or drums 10 and 11, respectively, two cables being provided for swinging the scoop or shovel in the one direction and a like number of cables being provided for swinging the scoop or shovel in the opposite direction. The arrangement of sheaves or drums 10 and 11 is shown very clearly in Fig. 1, said sheaves or drums, being supported at opposite ends of track G, respectively, being operatively mounted on shafts 12 that extend transversely of and are supported by beams $g$ of the track and said shafts are intergeared, as at 13, with a shaft 14, that extends lengthwise of the track and has bearing in boxes rigid with transverse members 15 supported by beams $g$, shafts 12 and 14 being intergeared in such a manner that shafts 12 and the sheaves or drums supported thereby will rotate in the same direction, so that in moving trolley or carriage F along track G, or in swinging the scoop in the one direction or the other, the respective cables leading over the sheaves or drums, located at the end of the track in the direction of the movement of the trolley or carriage or scoop, will be wound upon said sheaves or drums, and the cables leading from the sheaves or drums at the opposite end of the track will be unwound from said last-mentioned sheaves or drums.

The following mechanism is provided for locking the scoop or shovel in its extreme positions: The scoop or shovel at one side and at or near opposite ends, is provided with a slot or hole, $a^4$, said slots or holes being adapted to be engaged by a latch or bolt, K, that operates in a slide, L, secured as at $l\ l'$, to one side of the bail of the scoop or shovel. M represents a vibrating lever fulcrumed upon the same pin or bolt $l$ employed in securing the bolt or latch-slide L to the bail, and the construction and shape of slide L are preferably, as shown, to accommodate the location of the said lever between the slide and the adjacent side of the bail. Lever M is rounded at its lower extremity, as at $m$, and said rounded end engages a corresponding slot or depression K' in latch or bolt K. At the opposite end lever M terminates in an eye $m'$ for attaching a cord, N, leading to within reach of the operator. To lever M, between the fulcrum and eye or upper end thereof, is pivoted, as at O', an arm O that extends inwardly alongside of the bail and through an eye P secured to the central member of the bail, arm O being held against displacement from eye P by means of pin or key O² passed through the arm at the inner side of the eye. Arm O has shoulders, as at O³, and between said shoulders and eye P arm O has mounted thereon a coil-spring, Q, acting in the direction against lever M to cause the latter to hold latch or bolt K in engagement with the respective slot or hole $a^4$ in the side of the scoop or shovel, and securely lock the latter to the bail, the scoop or shovel being locked to the bail at slot or hole $a^4$ at one or the other extreme position of the scoop or shovel according to the direction in which the scoop or shovel is going to dip or operate in taking up the next succeeding load.

By the construction hereinbefore described, when the scoop or shovel is drawn up at the end of its stroke, by drawing on cord N, in the direction to actuate lever M to withdraw latch or bolt K from the respective slot or hole in the scoop or shovel and thereby unlocking the scoop or shovel, the latter will dump by gravity (see dotted lines, Fig. 2) whereupon by removing the pull or draft on said cord, latch or bolt K, by means of spring Q acting against lever M, will be actuated or shot to engage slot or hole $a^4$ at the opposite end of the scoop or shovel, as shown in dotted lines, Fig. 2, thereby locking the scoop or shovel in position to dip or operate in the opposite direction.

R represents stops for limiting the swinging of the scoop or shovel in either direction, a pair of stops located at opposite sides of the scoop or shovel, respectively, being provided at each end of the scoop or shovel. Said stops compoise, respectively, a plate, riveted, as at $r$, to the respective side of the scoop or shovel just below the respective lip-plate B, and provided, at its outer end, with a lateral flange $r'$ that constitutes the stop, flange $r'$ being largest at its lower end and thence gradually reduced to zero at its upper end, as shown in Fig. 2, to present as little obstruction as practicable in the dipping of the scoop or shovel.

The scoop or shovel is supposed to lift heavy loads, perhaps a ton, more or less, at a time, and hence considerable power is required to operate the scoop or shovel.

By means of the provision hereinbefore described for attaching two cables, one on each side, for moving the scoop or shovel in the one direction and a like number of cables similarly disposed for moving the scoop or shovel in the opposite direction, the scoop or shovel is relieved from all lateral strain and is swung in the one direction or the other as desired according to the direction of rotation of the sheaves or drums 10 and 11 on and from which the cables are adapted to be wound and unwound, as hereinbefore described.

To vary the sweep of the scoop or shovel to enable the scoop or shovel to be operated equally well at different elevations the scoop or shovel-arm or handle is composed of sections adapted to telescope the one within the other, thereby enabling the arm or handle to be lengthened or shortened as required. When the arm or handle is drawn out its full length the scoop or shovel has its maximum sweep, and the sweep is reduced by telescoping or shortening the arm or handle. The arm or handle shown is composed of three sections, (see Fig. 2) the lower section 20 being adapted to move endwise inside of the central tubular section 21 and the latter being movable endwise within the upper tubular section 22, the central section being secured to the lower section in the desired adjustment by means of a clamp 23.

In operating the scoop, the pressure endwise on the handle caused by the scoop engaging the material, in dipping or taking up the load, would tend to collapse or shorten the handle, that is, central section 21 of the arm or handle would be caused to enter farther into upper section 22. To prevent this, I employ a liquid blocking, usually water. One of the trunnions at the upper end of the handle is hollow or perforated longitudinally, as at 24, with the perforation in open relation with the interior or chamber 25 of tubular section 22. To the outer end of said trunnion is secured a valve, 26, to which is attached a pipe or tube, preferably a flexible hose or tube, 27, that leads to a tank 28 adapted to hold liquid, supported by trolley or carriage F, open communication between tank 28 and chamber 25 of section 22 of the scoop or shovel-arm or handle being established or cut-off according as said valve is opened or closed. Upon drawing apart sections 21 and 22 of the arm or handle to lengthen the latter valve 26 is opened to permit liquid to flow into chamber 25. Sections 21 and 22 of the arm or handle are, of course, closed at their upper end and suitable packing is interposed between the upper end of section 21 and the adjacent surface of section 22 to form a liquid-tight joint to prevent leakage at this point. Chamber 25 of the arm or handle having filled with liquid after sections 21 and 22 of the arm or handle have been properly adjusted apart, valve 26 is closed. By the means just described the arm or handle may be securely locked as against collapsing or shortening in using the scoop or shovel. If it is desired to shorten the arm or handle it is merely necessary to open valve 26 to permit liquid to be displaced from chamber 25 of the arm or handle and forced back into tank 28, and whenever the arm or handle has been adjusted to its proper length, the same upon closing the valve is blocked by the liquid in chamber 25 of the handle, so that the handle cannot shorten automatically.

If in the operation of the scoop or shovel it is found that the handle is too long, by opening valve 26 the handle, of course, will shorten automatically by engagement with the material into which it is dipped, and when the handle has reached its proper length, the same may be blocked against shortening by closing valve 26, and such manipulation of the valve may be effected without stopping the scoop or shovel. It is better practice to have the handle long enough at the outstart, for if the handle is found to be too long, it can by the means indicated, be easily and quickly shortened to the length required.

By the construction hereinbefore described, the scoop or shovel and attachments, are not only exceedingly simple and durable but the scoop or shovel is adapted to do twice the amount of work as compared with the devices heretofore devised for the purpose.

What I claim is—

1. In a scoop or shovel of the variety indicated, the combination with the body thereof that, in the main, is composed of three sections, a central section, A′, and two side-sections, A², the latter being flanged inward, as at $a$, and riveted, as at $a'$, to the central section, of a plate, as at B, embracing the respective ends of the scoop or shovel and secured to the central and side sections of the body of the scoop or shovel substantially as indicated, said plates at their upper ends terminating, respectively, in a pointed lip, substantially as and for the purpose set forth.

2. A scoop or shovel trunnioned or pivoted to and between the ends of a bail that at its ends is provided with suitable means for attaching cables whereby the scoop or shovel may be swung in opposite directions, substantially as set forth.

3. The combination with a scoop or shovel, trunnioned or pivoted to and between the ends of a bail, the bail at opposite sides of its pivotal bearing being provided with ears, as at C², of clevises, as at H, secured to said ears, substantially as and for the purpose set forth.

4. The combination with a trolley or carriage provided with eye-bolts, as at E, of a scoop or shovel trunnioned or pivoted to and between the ends of a bail provided with a handle, said handle, at its upper end, having lateral trunnions journaled in the eyes of the eye-bolts aforesaid, substantiallly as shown and described.

5. The combination with a double-ended scoop or shovel provided with a bail, substantially as described, of means for locking the scoop or shovel to the bail in the extreme positions of the scoop or shovel, substantially as set forth.

6. The combination with a double-ended scoop or shovel provided with a bail, substantially as described, of means for locking the scoop or shovel to the bail in the extreme positions of the scoop or shovel, said means comprising a latch or bolt and a spring acting in the direction to retain said latch or bolt in its shot position, and a slot or hole in the body of the scoop or shovel at or near each end thereof for receiving said latch or bolt in the shot position of the same, substantially as set forth.

7. The combination with a scoop or shovel of the variety indicated, pivoted, as at C', to and between the ends of a bail, of a latch or bolt provided with a slot or depression $k$, a lever pivoted to the bail, one end of said lever engaging said slot or depression in the latch or bolt, and the opposite end of the lever having attached a cord, and a spring acting against the lever in the direction to retain the latch or bolt in its shot position, the body of the scoop or shovel at or near each end thereof being provided with a slot or hole for receiving said latch or bolt, substantially as and for the purpose set forth.

8. The combination with a scoop or shovel of the variety indicated, pivoted to and between the ends of the bail, one side of the scoop or shovel at or near each end thereof being slotted, as at $a^4$, of a slide, as at L, secured to the adjacent member of the bail, a latch or bolt, K, adapted to operate in said slide a lever, M, adapted to actuate said latch or bolt, and a spring Q acting against said lever, substantially as indicated, said latch or bolt being adapted to engage the respective slots, aforesaid, substantially as and for the purpose set forth.

9. The combination with a scoop or shovel of the variety indicated, pivoted to and between the ends of a bail, one side of the scoop or shovel, at or near either end, being slotted, as at $a^4$, of mechanism for locking the scoop or shovel to the bail in the extreme positions of the scoop or shovel, said mechanism comprising the following elements: a slide, L, secured to the bail; a latch or bolt, K, operating in said slot, and having a rounded slot, or depression, $k$; a vibrating-lever fulcrumed, as at $l$, and rounded at its lower end for engaging the corresponding slot or depression $k$ in the latch or bolt, the opposite end of the lever terminating in an eye, $m'$, an eye, P, secured to the bail, an arm, O, pivoted to lever M and extending through eye P, substantially as indicated, a stop for limiting the outward movement of said arm, and a spring, Q, mounted on said arm and acting in the direction against lever M, the latch or bolt aforesaid being adapted to engage the respective slots $a^4$ in the sides of the scoop or shovel, substantially as and for the purpose set forth.

10. In a scoop or shovel of the variety indicated, a pair of stops, as at R, located at each end of the scoop, the stops of a pair being located at opposite sides of the scoop or shovel, respectively, and comprising, respectively, a plate pivoted, as at $r$, to the respective side of the scoop and provided at its outer end with a lateral flange, $r'$, the latter being larger at its lower end and thence gradually reduced to zero, substantially as shown and described.

11. The combination with the scoop or shovel-handle, comprising two tubular sections closed at their upper ends and adapted to telescope the one within the other, the upper section having lateral trunnions and one of said trunnions being perforated longitudinally, of a valve for closing said perforation, substantially as and for the purpose set forth.

12. The combination with a trolley or carriage, of a scoop provided with a handle comprising two tubular sections adapted to be telescoped the one within the other, said sections being closed at their upper ends and the upper section being trunnioned to said trolley or carriage or an attachment of the same, one of the trunnions being perforated longitudinally, a tank or reservoir supported by said trolley or carriage, a pipe or tube for establishing open communicaton between said tank or reservoir and the chamber of the aforesaid perforated trunnion, and a valve for closing said perforation, substantially as set forth.

In testimony whereof I sign this specification, in the presence of two witnesses, this 4th day of August, 1892.

RICHARD THEW.

Witnesses:
C. H. DORER,
WARD HOOVER.